United States Patent [19]
Lyon et al.

[11] 3,765,808
[45] Oct. 16, 1973

[54] APPARATUS FOR EXTRUDING THERMOPLASTIC TUBING

[75] Inventors: John Bennett Lyon, Richmond, Va.; Hung Han Yang, Clinton, Iowa

[73] Assignee: E. I. du Pont de Nemours and Company, Wilmington, Del.

[22] Filed: Nov. 18, 1970

[21] Appl. No.: 90,832

Related U.S. Application Data

[62] Division of Ser. No. 756,477, Aug. 30, 1968, abandoned.

[52] U.S. Cl. ............................... 425/72, 264/95
[51] Int. Cl. .................................... B29c 25/00
[58] Field of Search ............... 18/14 A, 14 G, 14 H, 18/14 P, 14 R, 14 S, 5 BE, 8 QM, 1 E, 12 DM, 12 TT, DIG. 16; 264/95; 425/72

[56] References Cited
UNITED STATES PATENTS

| | | |
|---|---|---|
| 3,142,092 | 7/1964 | Ralston .............................. 18/14 S |
| 2,987,765 | 6/1961 | Cichelli .............................. 18/14 G |

Primary Examiner—J. Spencer Overholser
Assistant Examiner—Dewalden W. Jones
Attorney—Francis A. Paintin

[57] ABSTRACT

Tubular film casting and orientation by extruding a molten thermoplastic polymer (e.g., polyethylene or polypropylene) through an annular die and melt-drawing the tubular film over an undercut internal quench mandrel while directing helium along the undercut portion of the mandrel, preferably at a pressure sufficient to resist film neck-in.

3 Claims, 1 Drawing Figure

PATENTED OCT 16 1973 3,765,808
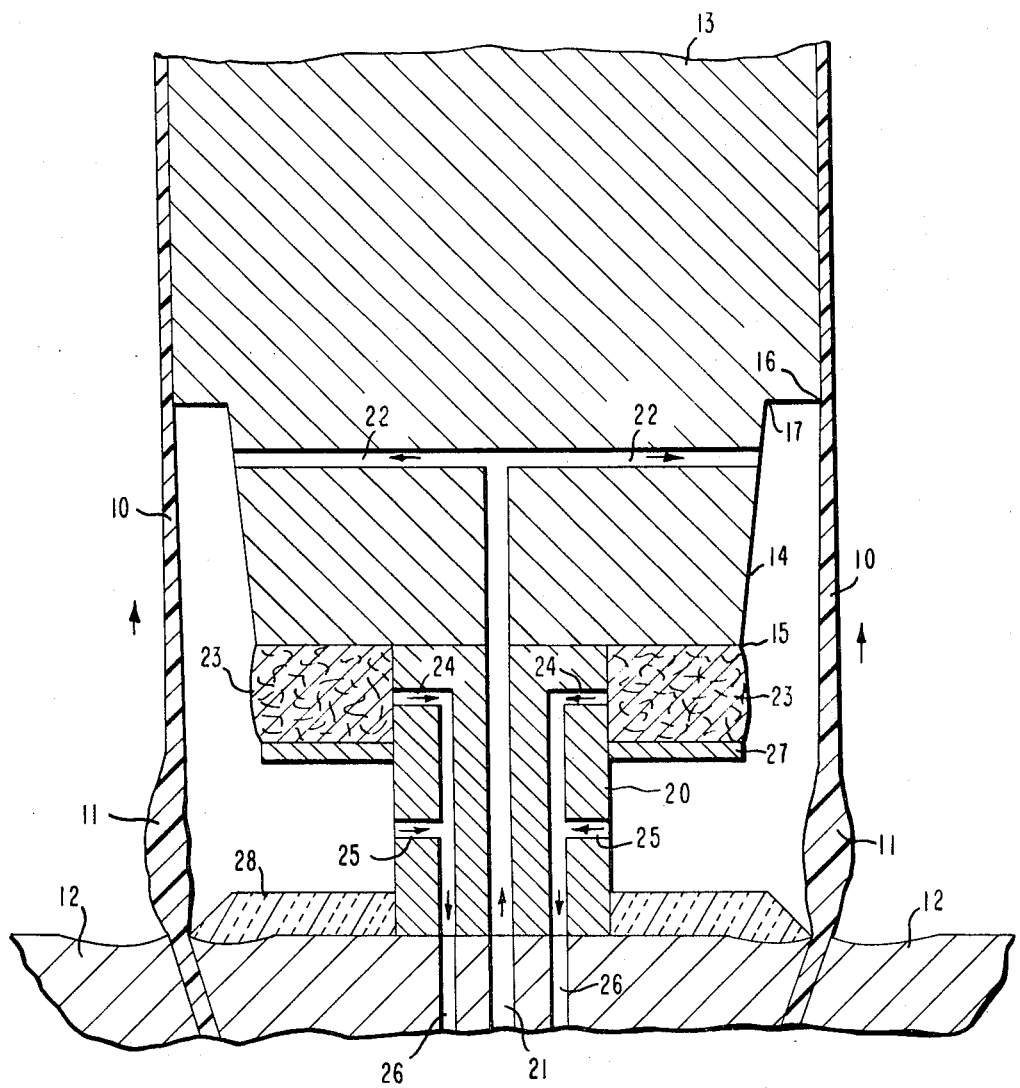
INVENTORS
JOHN BENNETT LYON
HUNG HAN YANG
BY Francis A. Painter
ATTORNEY

APPARATUS FOR EXTRUDING THERMOPLASTIC TUBING

CROSS REFERENCE TO RELATED APPLICATION

This application is a division of application Ser. No. 756,477, filed Aug. 30, 1968, now abandoned.

BACKGROUND OF THE INVENTION

This invention relates to the production of thermoplastic tubing and, more particularly, to the quenching of extruded tubular films of such polymers.

The production of thermoplastic tubing of polymers such as polyethylene and polypropylene is known in the art, for example, as described in Goldman et al., U. S. Pat. No. 3,231,642, issued Jan. 25, 1966. In its initial phases, this process involves the extrusion of the polymer through an annular die to form a molten tubular film which is then drawn over an internal quench mandrel to cool the polymer to a temperature below its formative state, i.e., at least about 20°C. below the orientation temperature range. A suitable quench mandrel is described in the Goldman et al. patent above as having internal coils through which a liquid cooling medium is circulated.

A problem which frequently occurs in the use of such a process is caused by the volatile components present in the polymer, e.g., anti-oxidants, slip agents, and the like. When the molten polymer emerges from the annular die, these volatiles migrate to the polymer surface and volatilize into the air immediately surrounding the molten tubular film. As the film advances toward the quench mandrel, some of the volatile components condense at the critical edge of the quench mandrel. As the molten film is drawn over the mandrel, the condensate droplets are picked up and trapped between the film and the mandrel surface. The heat of the film volatilizes the trapped condensate causing surface irregularities on the film known as "orange peel," "pimples" or "grooves" which result in corresponding defects in the final biaxially stretched film.

SUMMARY OF THE INVENTION

In a tubular film casting and orientation process comprising the steps of extruding a molten thermoplastic polymer through an annular die, melt-drawing the tubular film over an undercut internal quench mandrel, the improvement of introducing a flow of helium along the undercut portion of said mandrel and adjacent the tubular film in the zone between said die and the plane of initial quenching, the temperature of said helium being substantially below the film temperature in said zone. The helium pressure within said zone is preferably sufficient to resist film neck-in.

BRIEF DESCRIPTION OF THE DRAWING

FIG. 1 represents a schematic elevational cross section of portions of the extrusion die/quench zone employed in the present invention.

DETAILED DESCRIPTION OF THE INVENTION

For the purposes of this invention, the term "undercut internal quench mandrel" means an internal quench mandrel of the type described in the Goldman et al. patent wherein the portion nearest the annular die has been concentrically reduced in diameter such that the tubular film being extruded from the die and drawn over the quench mandrel does not touch the mandrel until it has passed over the end and advanced some distance along the length thereof. Such a mandrel is illustrated in the accompanying drawing.

The term "plane of initial quenching" means the plane perpendicular to the axis of the quench mandrel defined by the circumferential touch-down point at which the tubular film first actually comes into contact with the mandrel as it is drawn thereover along its length. In actuality the contact is not entirely "touching," but rather "thermal" since an interlayer of helium probably prevents actual physical contact with attendant melt stick, etc.

The over-all process for the preparation of polymers such as polyethylene and polypropylene is described in the Goldman et al. U.S. Pat., No. 3,231,642, which teachings are incorporated herein by reference to avoid duplication and unnecessary lengthening of the description of this invention.

Referring now to the drawing, a tubular film 10 is drawn from the swollen, molten thermoplastic polymer ring 11 which is extruded from the annular die 12. The internal quench mandrel 13 is suitably provided with internal cooling means (not shown) such as those described in the Goldman et al. U.S. Pat., No. 3,231,642. The mandrel 13 has an undercut portion 14 which begins at the leading edge of the mandrel 15 and terminates at the touch-down point 16. The touch-down point is actually a circumferential ring around the quenching mandrel which defines the plane of initial quenching described above.

The configuration of the undercut portion 14 may be as depicted in the drawing; however, it may take a variety of other shapes and forms. For example, an undercut portion may be formed which is nothing more than a frusto-conical portion of the end of the mandrel 13 which tapers linearly from the points 15 and 16. Another suitable configuration is one in which the touch-down point 16 has an externally rounded surface, with the top of the undercut 17 having an internally rounded surface. Various configurations are readily apparent to one skilled in the art. The mandrel 13 is connected to the face of the die 12 by means of the support post 20.

A central helium inlet channel 21 is shown pausing through die 12, support post 20 and mandrel 13 and connecting with gas entrance ports 22. Thus, the passage of helium is permitted through the channel 21 and out through ports 22 and along the undercut portion 14. The temperature of the helium should be substantially below the film temperature adjacent the undercut portion. Since helium is used as a heat-transfer medium, the helium atmosphere is expected to have a temperature gradient in the radial direction from the inner surface of the melt to the undercut mandrel surface. If helium is supplied at room temperature, such temperature gardient in the helium atmosphere should be sufficient to enhance satisfactory heat transfer and hence precooling of the melt. Continuous circulation of the helium aids in maintaining the temperature gradient.

The volatiles mentioned above diffuse readily through the helium atmosphere and are condensed on the undercut portion 14. Absorbent packing 23 may be provided to absorb and retain the condensate which may form in sufficient amount on undercut portion 14 to drip off the end of the mandrel. Exit ports 24 and 25 are provided in the support post 20 to permit the helium flow through packing 23 and out through channels 26. The flow of helium can be reversed so that it passes out through ports 24 and 25 and inwardly through ports 22, if desired. The packing 23 is supported, as shown, on baffle plate 27 and an insulation disc 28 may be provided, as shown, to cover the face of the die 12.

Helium also functions during the extrusion-quenching process as a pressurizing medium. Melt "neck-in" during flat die casting is a commonly known phenomenon. In tubular casting, melt neck-in in the form of diametral contraction occurs due to a hoop stress induced by the machine direction melt drawdown. The diametral contraction is small, but varies with throughput, melt thickness, melt temperature, resin properties, etc. While the die-mandrel geometry can be designed to accommodate the bulk of neck-in, a flexible correction should be maintained for the neck-in variability. This is accomplished by applying a slight pressure of helium. The helium pressure controls the amount of neck-in so that the melt can touch down on the quench mandrel with a minimum of normal pressure. The minimum touch-down pressure is imperative to insure minimum frictional drag and melt defects.

The melt touch-down pressure is zero if the helium pressure equals the normal pressure in the melt induced by the draw-down hoop stress. From stress analysis, the normal pressure (p) in the melt is given by:

$$P = 4GME_x/\pi d^2 h$$

where
$G$ = melt viscosity
$M$ = volumetric rate of melt
$h$ = touch-down elevation above die
$d$ = die diameter
$E_x$ = melt elongation For example, operating with polypropylene at 500 lbs./hr.,
$G$ = 10,000 poises
$M$ = 65.5 cm.³/sec.
$h$ = 6.25 cm.
$d$ = 52.1 cm.
$E_x$ = 1.33, i.e., 33 percent draw down, substitution in the equation gives a solution as follows:
$P$ = 66 dynes/cm.²
= 0.026 in H₂O This illustrates the magnitude of helium pressure which can be applied without uncontrolled expansion of the molten tubular film.

The remaining portions of apparatus necessary to produce biaxially oriented thermoplastic polymeric film are shown in the Goldman et al. U.S. Pat., No. 3,231,642, the details of which are incorporated by reference herein.

The invention will now be described in connection with specific examples thereof.

EXAMPLE 1

Polyethylene having a density of 0.925 and a melt index of 1.5 is extruded at 500 lbs./hr. through an annular die of 15 inches nominal diameter and a 35-mil lip opening. The following conditions are maintained:
Die temp.: 195°C.
Melt temp.: 200°C.
Cast tube speed: 35 ft./min.
Quench mandrel temp.: 20°C.
Mandrel surface taper: 9 mils/inch
Mandrel surface finish: about 20–30 microinch RMS The melt is drawn over a quench mandrel which is arranged such that the touch-down point or plane of initial quenching is 4 inches above the die lips. The undercut portion on the mandrel is approximately 0.1 inch deep and extends about 2.5 inches from the end of the mandrel nearest the die to the touch-down point. A helium pressure of about 0.02 inch of water is maintained to control the melt touch-down. Volatiles from the melt can be seen to condense on the undercut portion of the mandrel. Measurement of the outside surface temperature of the melt typically indicates a precooling of about 7–8 centigrade degrees. It should be recognized that precooling of inside surface will be much more than this, i.e., about 20 to 50 centigrade degrees.

The length of the undercut portion can be increased from the 2.5 inches described above to about 4 inches with substantial helium flow being maintained along the undercut surface portion of the mandrel. If, however, under such circumstances, air is used to replace the helium, melt neck-in can be so severe that high drag forces of cast tubing on the quench mandrel will be experienced.

EXAMPLE 2

Polypropylene having a melt flow of about 5.5 dg./min. is extruded at about 50 lbs./hr. through an annular die of 5 inches nominal diameter and a 35-mil lip opening. The following conditions are maintained:
Die temp.: 195°C.
Melt temp.: 195°C.
Cast tube speed: 6 ft./min.
Quench mandrel tamp.: 15°C.
Mandrel surface taper: 12 mils/inch
Mandrel surface finish: 20–30 microinch RMS The polymer melt is drawn over a quench mandrel having an undercut portion in the configuration of an evenly tapered frusto-conical end of the mandrel. The distance from the plane of initial quenching is about 2.5 inches above the die lips, and the approximate length of the undercut portion is about 2.25 inches. Helium can be employed at the following rates and pressures:

| Flow Rate (cu. ft./hr.) | Pressure (inches of water) |
|---|---|
| 10 | less than 0.1 |
| 15 | 0.2 |
| 20 | 0.3 |

If the above example is attempted using air instead of helium, occasional melt sticking to the mandrel will be experienced.

The use of this invention as described above enables the preparation of cast tubular films which are substantially free from internal surface defects such as "orange peel," "grooves," "pimples" and smearing.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:

1. In a tubular film casting and orientation apparatus comprising an annular die for extruding a molten thermoplastic polymer and an undercut internal quench mandrel over which the tubular film is melt-drawn, the improvement of means for introducing a flow of helium along the undercut portion of said mandrel and adjacent the tubular film in the zone between said die and the plane of initial quenching, and an absorbent packing between said mandrel and said die.

2. An apparatus as defined in claim 1 wherein the undercut portion of said quench mandrel is provided with ports for the flow of helium through said zone.

3. An apparatus as defined in claim 1 wherein means are provided for the flow of helium through said packing and out of said zone.

* * * * *